J. H. & E. H. Anderson.

Revolving Harrow.

N° 30,709.      Patented Nov. 27, 1860.

Witnesses:

Inventors:
Jno. H. Anderson
Edwd. H. Anderson
per Munn & Co.
Attorneys

UNITED STATES PATENT OFFICE.

J. H. ANDERSON AND E. H. ANDERSON, OF EASTON, MARYLAND.

IMPROVEMENT IN CULTIVATORS.

Specification forming part of Letters Patent No. 30,709, dated November 27, 1860.

*To all whom it may concern:*

Be it known that we, JAMES H. ANDERSON and EDWARD H. ANDERSON, both of Easton, in the county of Talbot and State of Maryland, have invented a new and Improved Cultivator; and we do hereby declare that the following is a full, clear, and exact description of the same, reference being had to the annexed drawings, making a part of this specification, in which—

Figure 1:
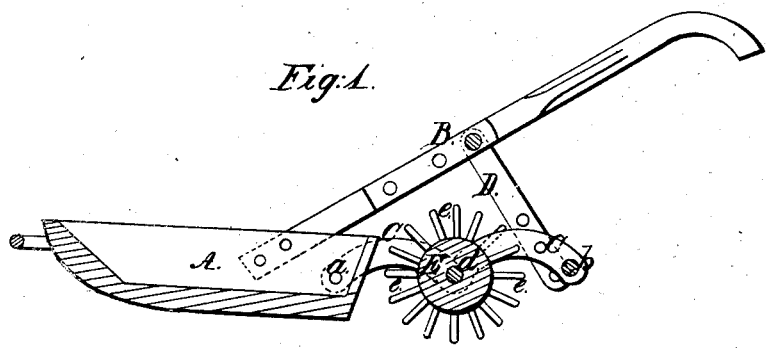
Figure 2:
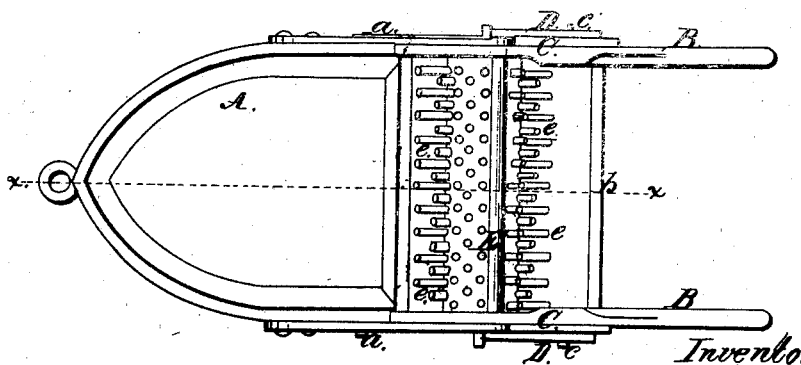

Figure 1 is a side sectional view of our invention; Fig. 2, a plan or top view of the same.

Similar letters of reference indicate corresponding parts in the two figures.

It is well known to agriculturists that the ordinary cultivators which are employed for pulverizing the soil and eradicating weeds from growing plants in hills and drills injure the young and tender roots which are near the surface of the ground and which serve as the main feeders for the plants.

The object of this invention is to obviate this difficulty and at the same time cause the earth to be thoroughly pulverized and loosened. To this end we employ a cast-metal or a wooden shoe shod with metal, provided with suitable handles, and having a toothed cylinder behind it, all constructed and arranged to operate, as hereinafter described, to effect the desired end.

To enable those skilled in the art to fully understand and construct my invention, I will proceed to describe it.

A represents a shoe, which is somewhat in the shape of a boat, the front being of curved form and meeting in a point, the bottom flat, and the back at right angles with the back parts of the sides of the shoe. This shoe may be of cast-iron, in one piece, or it may be of wood shod with metal at its bottom.

To each side of the shoe A there is attached a handle, B. These handles are inclined to an angle about equal to that of ordinary plow or cultivator handles. (See Fig. 1.)

To the back part of the shoe A, at each side, there is attached an arm, C. These arms are each attached to the shoe by a single bolt or pivot, a, and the outer ends of the arms C are connected each by a rod, b. The arms C are connected each by a bar, D, with the handles B B, the bars D being perforated with a series of holes, through either of which pins c pass into the arms C.

Between the two arms C C a cylinder, E, is placed and allowed to rotate freely, the shaft d of the cylinder having its bearings in the arms C C. The cylinder E has its periphery provided with radial spikes or teeth e.

The operation is as follows: The draft-animal is attached to the front end of the shoe A. The shoe, as the implement is drawn along, crushes all clods and completely pulverizes the earth, while the toothed cylinder E loosens up the soil, rendering it permeable to air and moisture without at all injuring the roots of the plants.

The teeth e may be made to penetrate the earth at a greater or less depth by adjusting the cylinder E higher or lower, which is done by placing the pins c in different holes in the bars D D.

The draft of this implement will be lighter than those constructed in the ordinary way. It may be readily turned from one row into another, can be used in the driest weather—the more frequently the better—and the shoe A may be supplied with stones to regulate the weight of the implement according to the work to be performed.

Any proper-shaped teeth may be used on the cylinder E; but those of ordinary straight form will probably answer as good a purpose as any.

Having thus described our invention, what we claim as new, and desire to secure by Letters Patent, is—

The combination of the shoe A and toothed cylinder E, constructed and arranged to operate substantially as and for the purpose set forth.

JAS. H. ANDERSON.
EDWD. H. ANDERSON.

Witnesses:
SAML. T. HOPKINS,
I. P. BLAKE.